United States Patent [19]

Shinzawa et al.

[11] Patent Number: 5,195,318
[45] Date of Patent: Mar. 23, 1993

[54] EXHAUST GAS PURIFYING DEVICE FOR AN INTERNAL COMBUSTION ENGINE

[75] Inventors: Motohiro Shinzawa; Shunichi Aoyama; Yoshiki Sekiya; Nobukazu Kanesaki, both of Kanagawa, Japan

[73] Assignee: Nissan Motor Co., Ltd., Yokohama, Japan

[21] Appl. No.: 634,850

[22] Filed: Dec. 27, 1990

[30] Foreign Application Priority Data

Dec. 28, 1989 [JP] Japan ................. 1-340747

[51] Int. Cl.$^5$ ............................................. F01N 3/02
[52] U.S. Cl. ..................................... 60/285; 60/286; 60/288
[58] Field of Search .................. 60/276, 285, 286, 288

[56] References Cited

U.S. PATENT DOCUMENTS

| 4,450,682 | 5/1984 | Sato | 60/286 |
| 4,549,398 | 10/1985 | Oishi et al. | |
| 4,558,565 | 12/1985 | Kojima | 60/286 |
| 4,698,966 | 10/1987 | Distel | 60/286 |
| 4,835,963 | 6/1989 | Hardy | 60/286 |

FOREIGN PATENT DOCUMENTS

| 0220484 | 9/1986 | European Pat. Off. |
| 3610057 | 9/1986 | Fed. Rep. of Germany |
| 3729857 | 9/1987 | Fed. Rep. of Germany |
| 58-51235 | 3/1983 | Japan |
| 162713 | 9/1983 | Japan ................. 60/286 |

OTHER PUBLICATIONS

Patent Abstracts of Japan, vol. 12, No. 384 (M-753) (Oct. 13, 1988).

*Primary Examiner*—Douglas Hart
*Attorney, Agent, or Firm*—Lowe, Price, LeBlanc & Becker

[57] ABSTRACT

Parameters which are related to the rate at which particulate matter accumulates and is reburnt, are monitored and the time at which a regeneration is required and/or the length of time a regeneration should be induced, are derived based on the same. The temperature at the inlet and outlet of a trap in which particulate matter is accumulated are monitored and measures such as throttling the induction and exhaust are implement in addition to energizing a heater disposed immediately upstream of the trap as required in order to elevate the trap temperature and to induce and maintain the reburning during a trap regeneration.

14 Claims, 14 Drawing Sheets

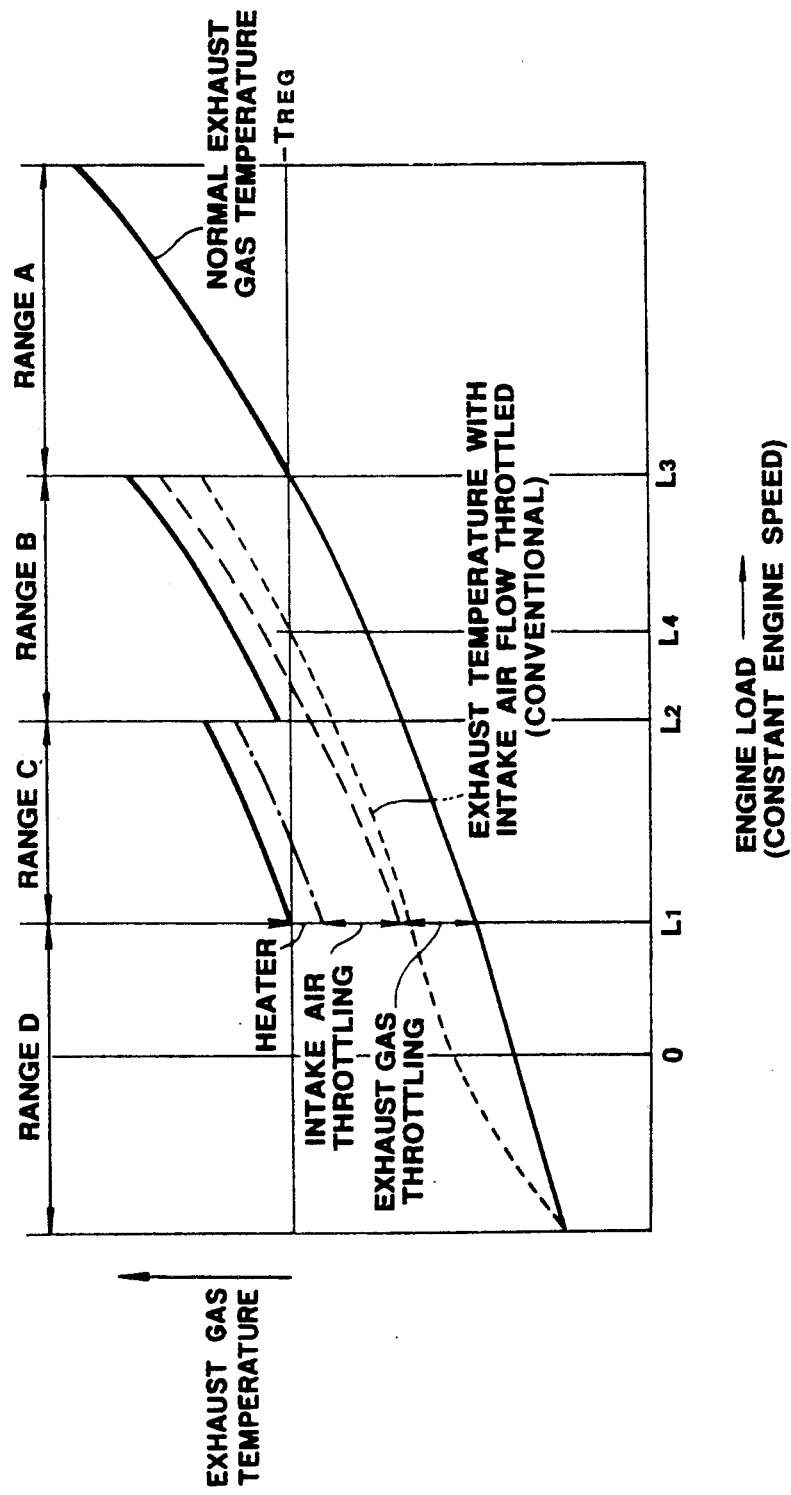

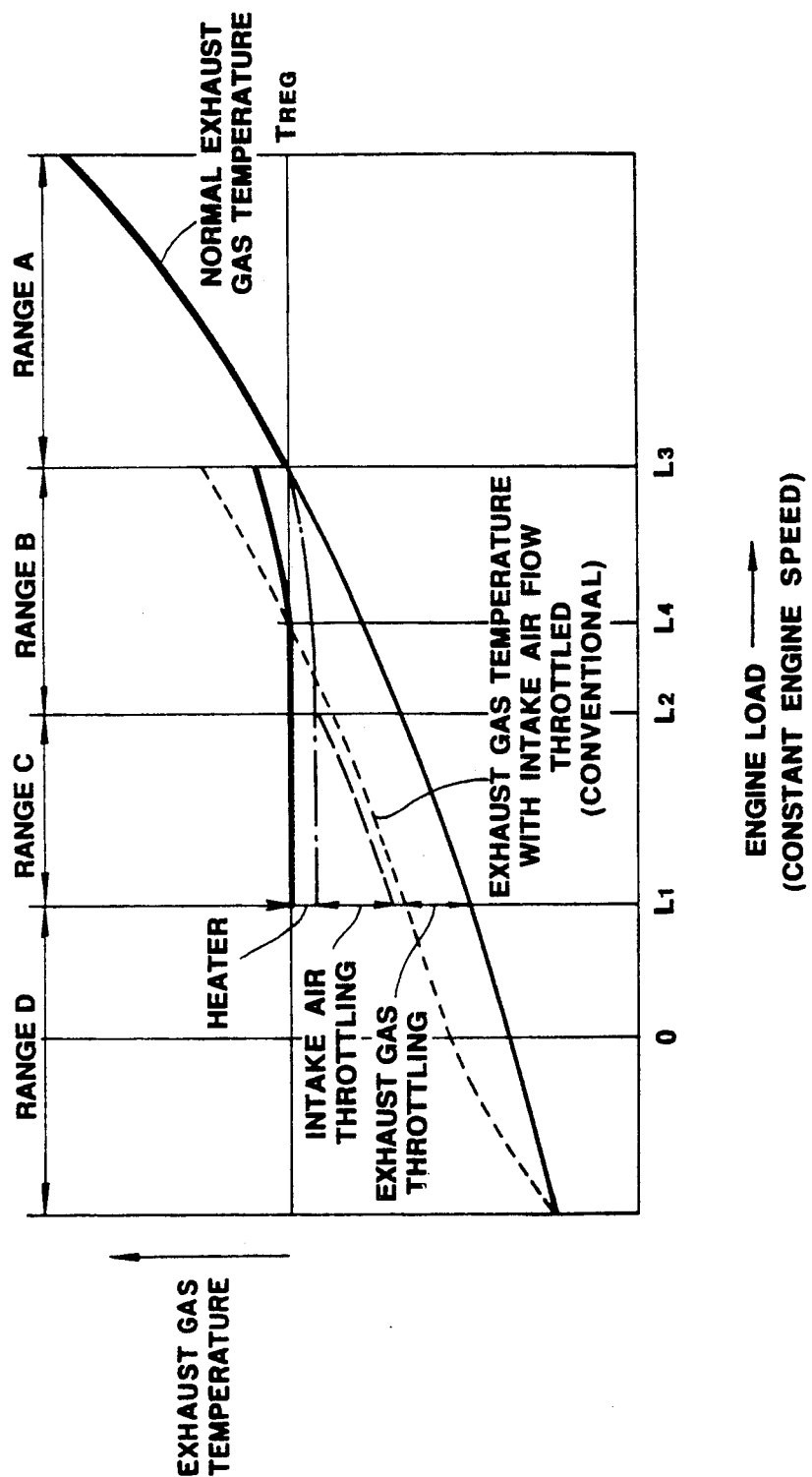

EXHAUST GAS PURIFYING DEVICE FOR AN INTERNAL COMBUSTION ENGINE

BACKGROUND OF THE INVENTION

1. Field of the Invention

The present invention relates generally to an internal combustion engine exhaust system and more specifically to an exhaust gas purifying device for reducing particulate matter emissions.

2. Description of the Prior Art

FIG. 1 shows an exhaust system which is disclosed in JP-A-58-51235 and which includes a trap for removing particulate matter (e.g. minute carbon particles) from the exhaust gases before they are released into the ambient atmosphere.

In this prior proposed arrangement the particulate matter which is contained in the gases exhausted from the combustion chambers of an internal combustion engine 1 into an exhaust conduit 2, are collected in a trap 3. This trap includes a heat resistant filter element (not shown in this FIGURE) which separates the particulate matter from the gases content of the engine exhaust.

In order to prevent the exhaust gas back pressure from rising excessively due to the accumulation of a large amount of particulate matter in the trap, it has been proposed to regenerate the trap from time to time.

More specifically, the engine includes an induction passage 5 in which a butterfly type throttle valve 6 is disposed. A lever 7 is connected to the shaft of the valve 6 and operatively connected with a diaphragm type vacuum motor 8 by way of a link 8a.

A solenoid valve 9 which controls communication between a vacuum pump 10 and a vacuum chamber 8b of the vacuum motor 8 is operatively connected with a control unit 15. This latter mentioned unit is connected with a fuel injection pump 11 and arranged to receive a load indicative signal produced by a load sensor 13 and an engine speed sensor 13. In this instance both of the sensors are associated with the pump 11 as shown. The control unit 15 is also connected with an induction pressure sensor 14 in a manner to receive a signal indicative thereof.

The control unit 15 is arranged to determine the timing with which the trap 3 should be regenerated based on either time or distance travelled. Upon such a determination being made, the control unit determines, based on the outputs of the above mentioned sensors, if the engine is operating in a predetermined mode wherein an excess of air is being inducted into the engine.

Given that the engine is operating in the requisite mode, the control unit issues a signal to the solenoid which induces the throttle valve to partially close. The degree to which the throttle valve is closed and induction is throttled is feedback controlled based on the output of the induction pressure sensor 14. This feedback control is such as to adjust the duty cycle of the solenoid driver signal in a manner to establish an essentially constant negative induction pressure (e.g. $-200$ mmHg) in the induction manifold downstream of the throttle valve 6. This is done to prevent the power output of the engine being excessively degraded and to prevent the operation of compression-ignition type engines being de-stabilized to the point where the accumulation of particulate matter exceeds the re-burning rate.

It is to be noted that generally the trap cannot be regenerated at low speed/low load and idling modes of operation even if the induction system is throttle in the above mentioned manner.

To overcome this problem it has been proposed to additionally throttle the exhaust system. However, this measure does not lend itself to stable engine operation and in some cases can lead to the situation wherein the back pressure reaches levels of 2–3 kg/cm$^2$ and results in the exhaust throttle valve sticking and/or or undergoing mechanical deformation.

SUMMARY OF THE INVENTION

It is an object of the invention to provide a system which enables the trap to be efficiently regenerated without encountering the above mentioned stick and mechanical deformation problems.

More specifically, a first aspect of the present invention comes in an exhaust purifying system which features: a trap which separates and collects particulate matter contained in the gases exhausted from an internal combustion engine; an exhaust throttle valve disposed in an exhaust conduit which leads from the internal combustion engine to the trap, the exhaust throttle valve being operatively connected with a first servo; an induction throttle valve disposed in an induction passage which leads to the engine, the induction valve being operatively connected with a second servo; sensor means for sensing engine speed and engine load; control means which is operatively connected with the sensor means and which contains a control schedule which is divided into first and second engine speed/load zones, the first zone being one in which the exhaust gases which are being produced by the engine have a temperature which is slightly lower than a predetermined regeneration temperature at which accumulated particulate material in the trap will spontaneously combust and induce trap regeneration, the second zone being one in which the exhaust gases being produced by the engine have a temperature which is significantly lower than the predetermined regeneration temperature, the control means being responsive to the sensor means for determining which of the two zones the engine is currently operating in and for controlling the operation of the first and second servos so that when the engine is operating in the first range only the induction throttle valve is closed to restrict induction, while in the second zone both the induction and the exhaust throttle valves are induced to close.

A second aspect of the present invention comes in an exhaust purifying system which features: a trap which is disposed in an exhaust passage and which separates and collects particulate matter contained in the gases exhausted from an internal combustion engine; trap heating means for heating the interior of the trap; a by-pass passage which by-passes the trap, the by-pass passage having an upstream end which communicates with the exhaust passage at a location upstream of the trap and a downstream end which communicates with the exhaust passage at a location downstream of the trap; a by-pass passage control valve which is disposed in the by-pass passage, the by-pass control valve being operatively connected with a servo; means for determining if the exhaust gases will have a temperature slightly below a predetermined trap regeneration temperature at which accumulated particulate matter in the trap will undergo spontaneous combustion; and means responsive to the determining means for operating the servo in a manner to close the by-pass passage control valve and for energizing the trap heating means.

A third aspect of the invention comes in an exhaust purifying system which features: a trap which is disposed in an exhaust passage and which separates and collects particulate matter contained in the gases exhausted from an internal combustion engine; trap heating means for heating the interior of the trap; a by-pass passage which by-passes the trap, the by-pass passage having an upstream end which communicates with the exhaust passage at a location upstream of the trap and a downstream end which communicates with the exhaust passage at a location downstream of the trap; a by-pass passage control valve which is disposed in the by-pass passage, the by-pass control valve being operatively connected with a servo; first sensor means for sensing the engine speed and temperature; second sensor means for sensing the temperature at the upstream and downstream ends of the trap; means responsive to the first and second means for determining if the engine is operating in a zone wherein the exhaust gas temperature at the upstream end of the trap significantly below a predetermined regeneration temperature at which the accumulated particulate matter in the trap will undergo spontaneous combustion, and for determining if the exhaust gas temperature at the downstream end of the trap is below the predetermined regeneration temperature by a predetermined amount; and means responsive to the determining means for opening the by-pass control valve and for energizing the trap heating means.

A fourth aspect of the present invention comes in an internal combustion engine which features: a first sensor which senses engine speed; a second sensor which senses engine load; a third sensor for sensing engine coolant temperature; an induction passage a first flow control valve disposed in the induction passage for restricting the amount of air passing therethrough; a first servo operatively connected with the first flow valve; a first servo control valve which controls the operation of the first servo, the first servo control valve being arranged to be responsive to a first control signal; and exhaust conduit; a second flow control valve disposed in the exhaust conduit for restricting the flow of gas therethrough; a second servo operatively connected with the second flow valve; a second servo control valve which controls the operation of the second servo, the second servo control valve being arranged to be responsive to a second control signal; a trap disposed in the exhaust conduit downstream of the second valve, the trap being arranged to separate and collect particulate matter contained in the gases which flow through the exhaust conduit; a heater disposed in the exhaust passage immediately upstream of the trap; a by-pass passage having an upstream end fluidly communicated with the exhaust passage at a location upstream of the second valve and a downstream end communicating with the exhaust passage a location downstream of the trap; a third flow control valve disposed in the by-pass passage for restricting the flow of gas therethrough; a third servo operatively connected with the third flow valve; a third servo control valve which controls the operation of the third servo, the third servo control valve being arranged to be responsive to a third control signal; a fourth sensor for sensing the temperature of the gases entering the trap; a fifth sensor for sensing the temperature of the gases coming out of the trap; a sixth sensor for sensing a pressure differential which prevails across the upstream and downstream ends of the trap; a control unit operatively connected with the heater, the first to sixth sensors and the first to third flow control valves, the control unit including circuitry which includes means for selectively energizing the heater and for operating the first to third flow control valves in a manner which enables the flow through the induction and exhaust conduits to be selectively throttled to increase the temperature in the trap to a level whereat combustion of the combustible fraction of the particulate matter collected therein, is induced.

A further feature of the comes in that the above mentioned internal combustion engine is arranged such that the first and second control signals are variable and wherein the first and second control valves are arranged to respond to the first and second control signal in a manner in which the first and second servos are controlled to position the first and second flow control valves in or between predetermined minimum and maximum closure positions.

Another feature of the invention comes in that the above mentioned internal combustion engine further features: an induction pressure sensor and an exhaust pressure sensor, the induction and exhaust pressure sensors being operatively connected with the control unit, the outputs of the induction and exhaust pressure sensors being used for feedback control of the first and second flow control valve positions.

BRIEF DESCRIPTION OF THE DRAWINGS

FIG. 7 is a graph showing the manner in which the exhaust gas temperature varies in each of the engine load/speed zones shown in FIG. 6 and the effect of the various temperature increasing techniques have thereon;

FIG. 10 is a graph similar to that shown in FIG. 7 showing the exhaust gas temperature characteristics obtained with the second embodiment;

DETAILED DESCRIPTION OF THE PREFERRED EMBODIMENTS

Figure 1:
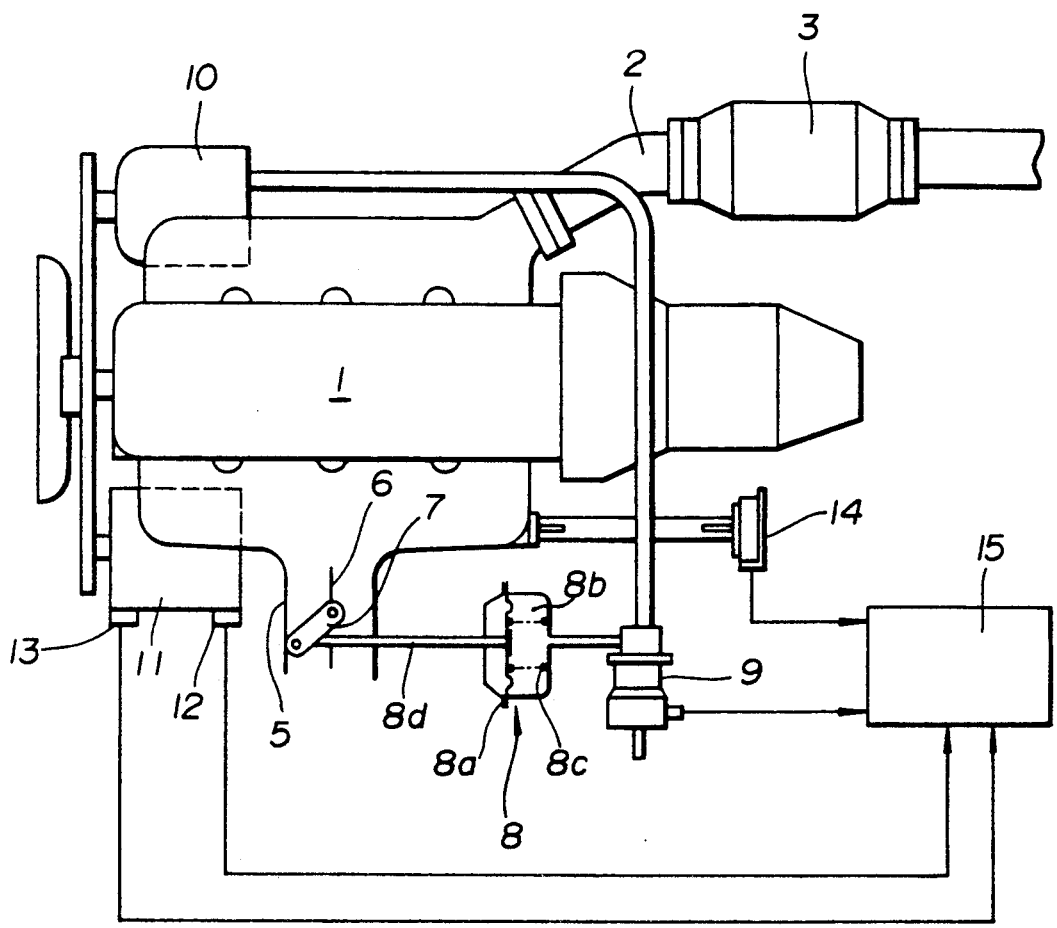
FIG. 1 is a plan view of the prior art system discussed in the opening paragraphs of the instant disclosure.
Figure 2:
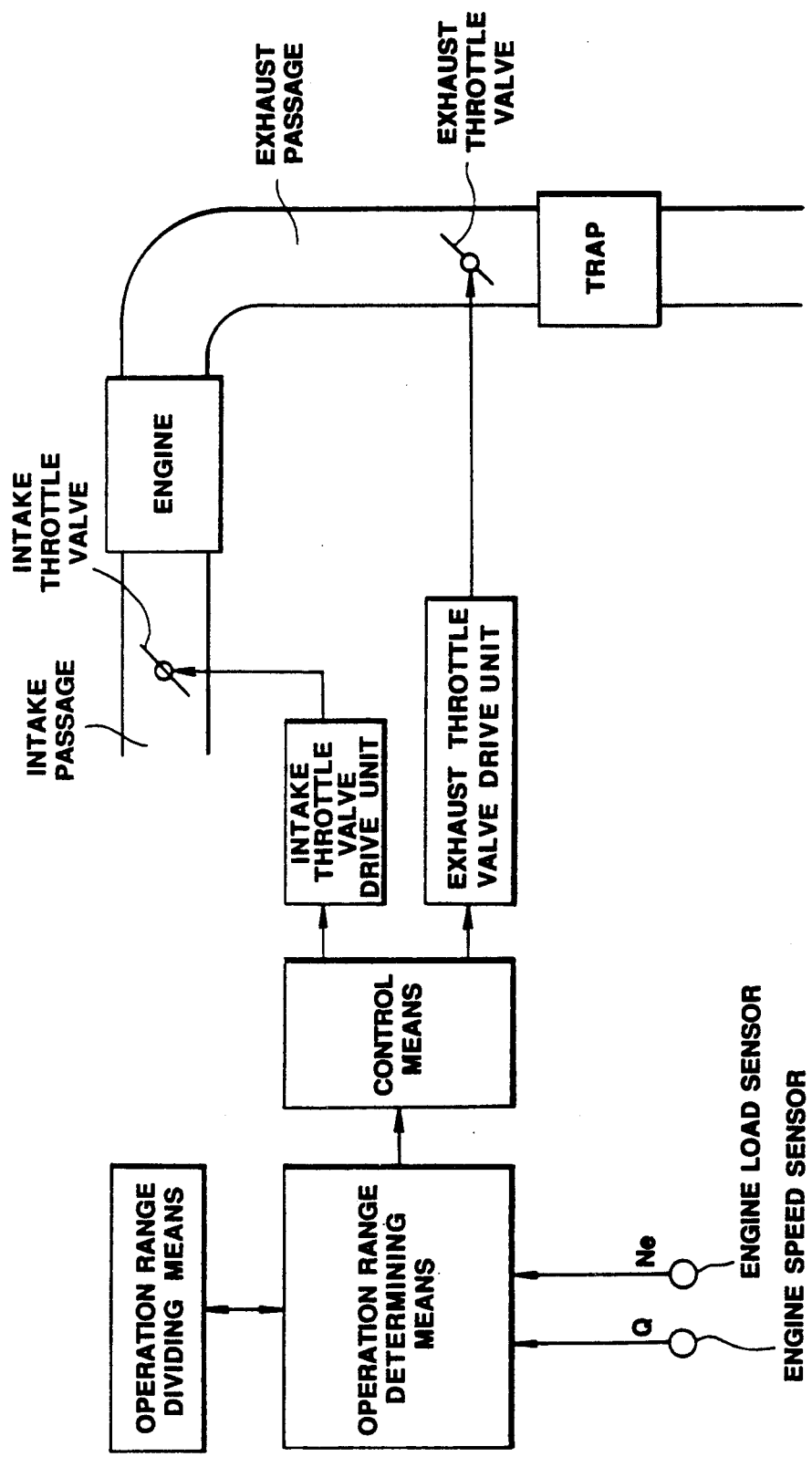
FIGS. 2 to 4 are block diagrams showing the conceptual arrangements of the invention.

FIG. 2 illustrates in block diagram form, the concept mentioned in the proceeding "Summary of the Invention" wherein intake and exhaust throttle valves are used in combination with one another to increase the temperature of the exhaust gases reaching the trap under given modes of engine operation.

Figure 3:
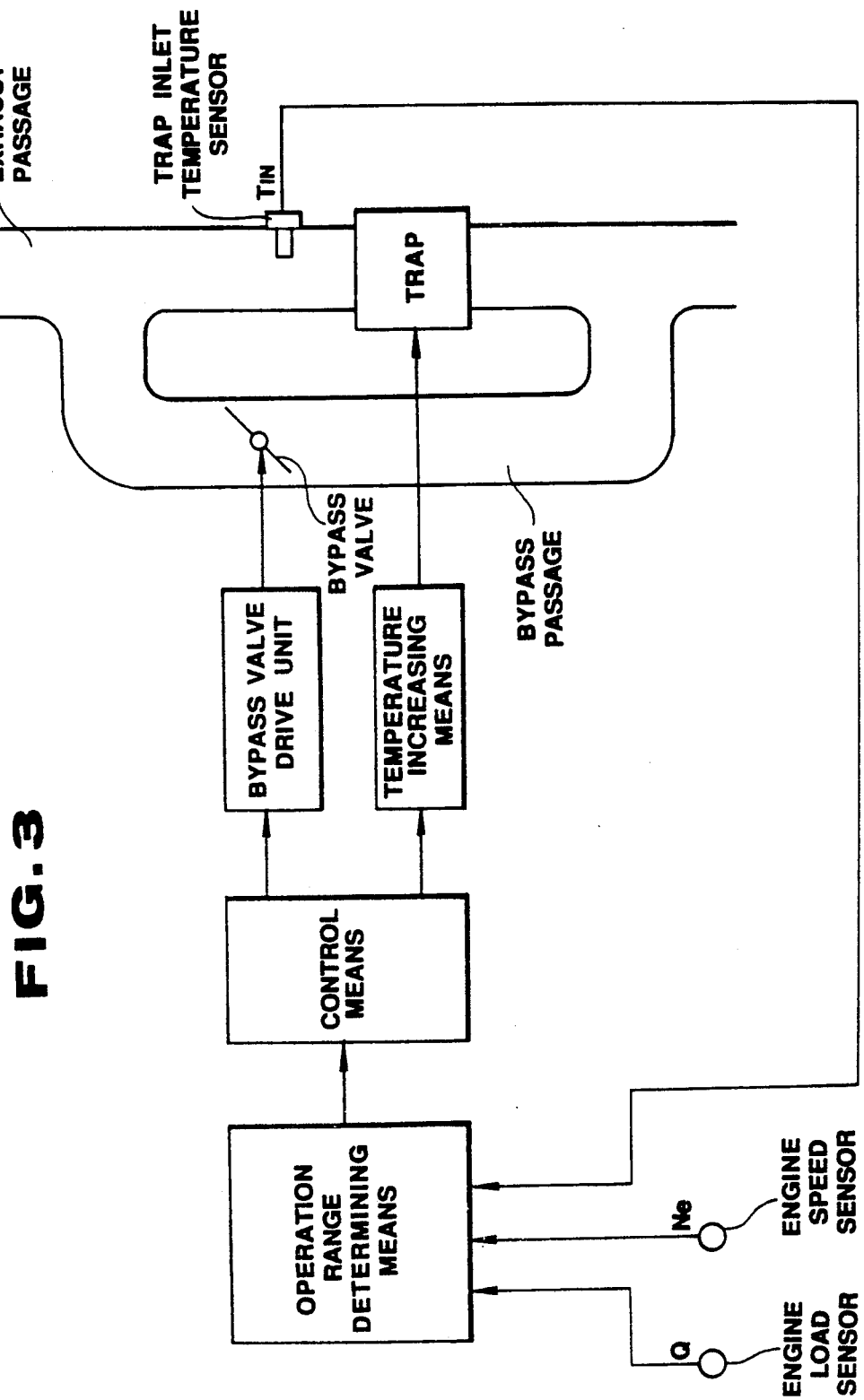

FIG. 3 illustrates in block diagram form, the concept mentioned in the preceding "Summary of the Invention" of providing a by-pass passage around the trap, the use of a by-pass valve to control the passage of exhaust gases through the by-pass passage, the use of trap temperature increasing means in combination with the by-pass control and the use of a temperature sensor disposed upstream of the trap in combination with sensors which monitor engine operation.

Figure 4:
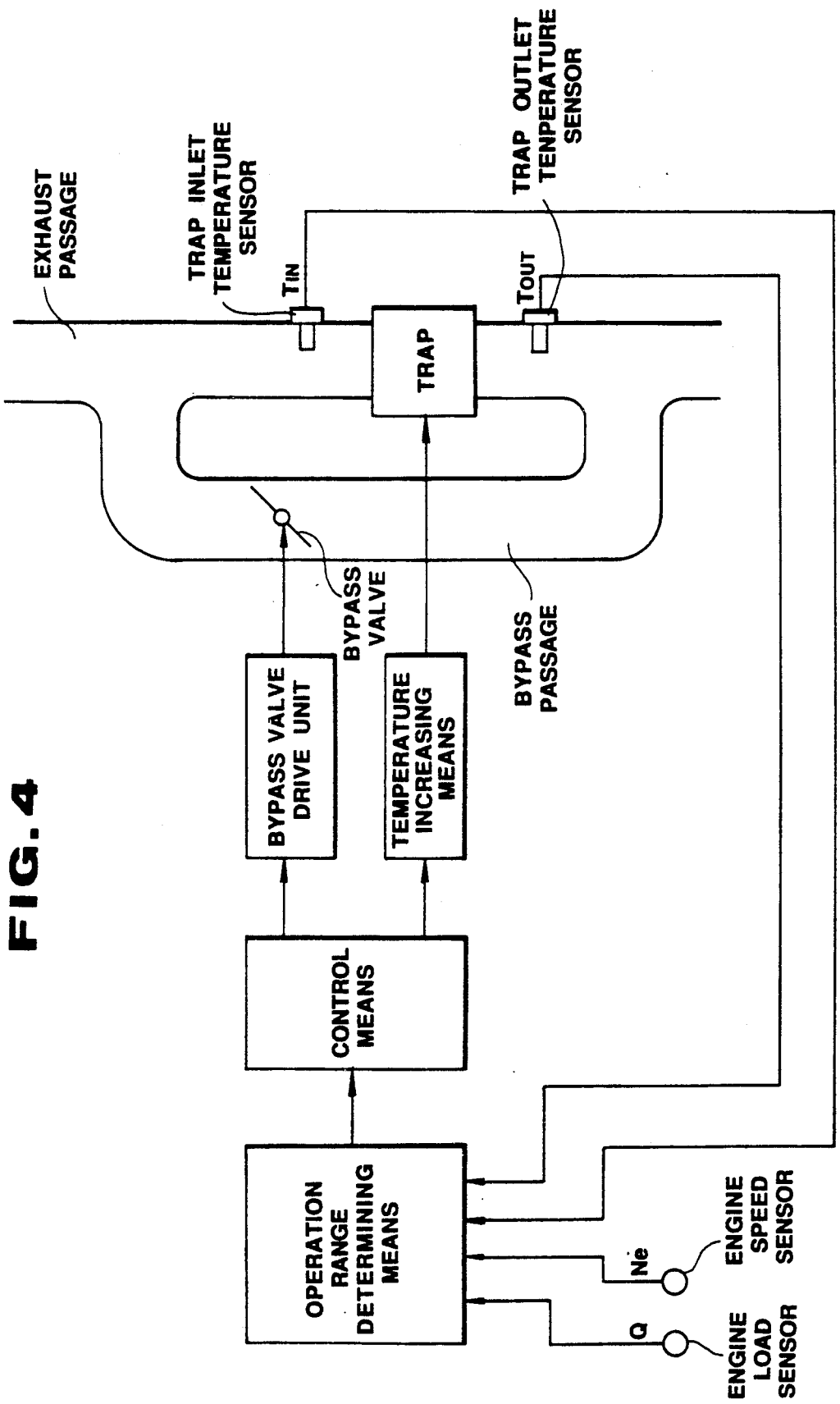

FIG. 4 illustrates in block diagram form, the concept mentioned in the preceding "Summary of the Invention" of providing a by-pass passage around the trap, the use of a by-pass valve to control the passage of exhaust gases through the by-pass passage, the use of trap temperature increasing means in combination with the by-pass control and the use of temperature sensors upstream and downstream of the trap in combination with sensors which monitor engine operation.

Figure 5:
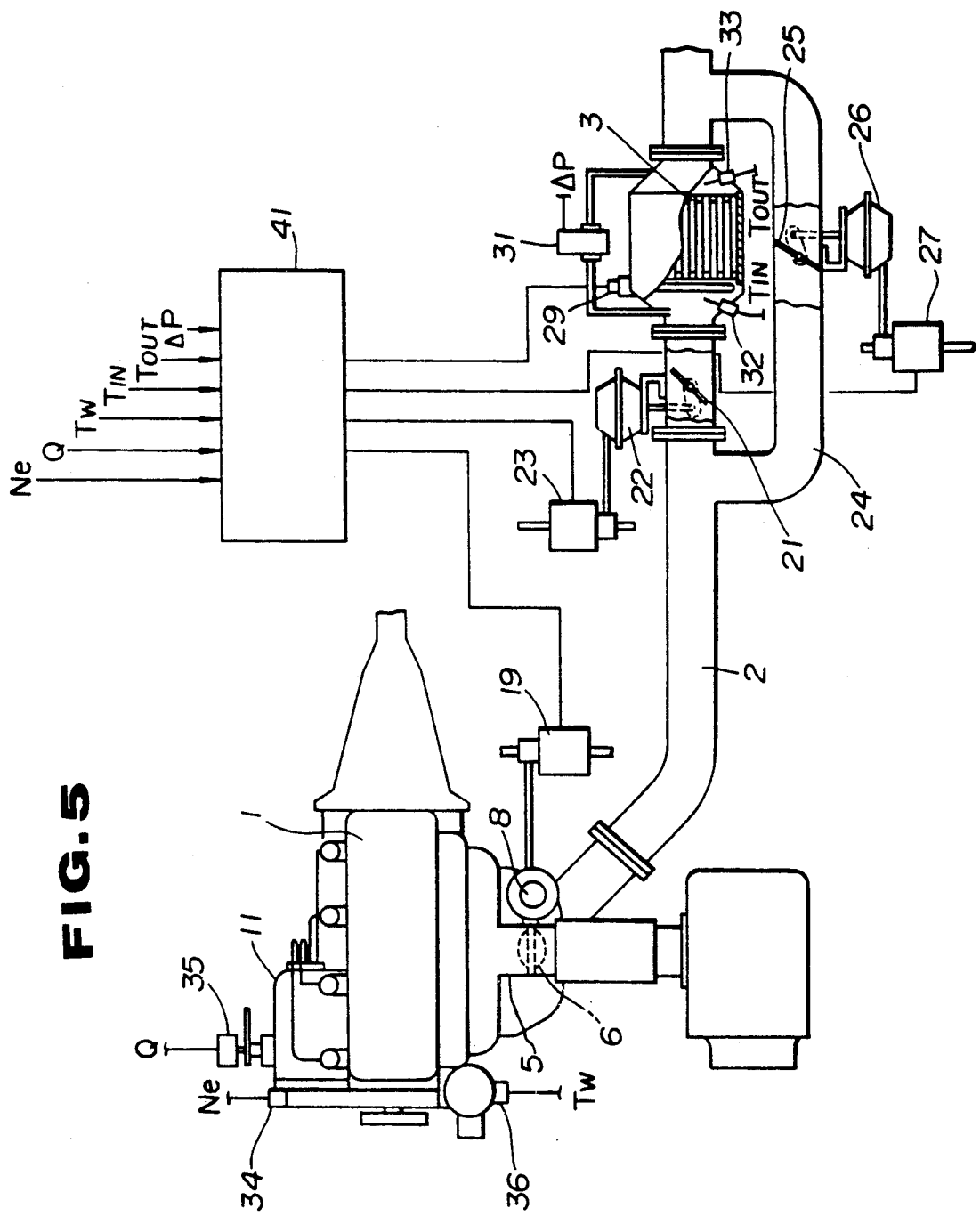
FIG. 5 is a plan view showing an engine system equipped with a particulate trap and regeneration system to which a first embodiment of the present invention is applied.

FIG. 5 shows an engine system to which the embodiments of the present invention which incorporate the above concepts are applied. In this arrangement a normally open induction throttle valve 6 is disposed in the induction manifold 5 and operatively connected with a vacuum servo motor 8 in a similar manner as disclosed in connection with the prior art.

In this arrangement, the vacuum chamber of the vacuum servo motor 8 is connected with a source of vacuum such as a vacuum pump by way of a three way solenoid valve 19. when the valve 19 is switched to its ON state a negative pressure of a predetermined magnitude is supplied into the vacuum chamber of the servo in place of atmospheric pressure.

A normally open butterfly type exhaust throttle valve 21 is disposed in the exhaust conduit or passage 2 at a location upstream of the particle trap 3. This valve is operatively connected with a vacuum servo motor 22. A three-way solenoid valve 23 is arranged to control the supply of negative pressure from the above mentioned source to the vacuum chamber of the motor.

A by-pass passage 24 is arranged to lead from upstream of the trap 3 to a location downstream thereof. A normally closed butterfly type by-pass control valve 25 is disposed in the by-pass passage 24 and operatively connected with a vacuum servo motor 26. A solenoid valve 27 is arranged to control the supply of negative pressure into the vacuum chamber of this device.

A heater 29 is disposed immediately upstream of the trap filter and is arranged to heat the trap upon being supplied with an energizing signal from a control unit 41.

In this embodiment, the heater 29 and the by-pass control valve 25 are used in combination to define a trap temperature control arrangement.

A semi-conductor type pressure sensor 31 is arranged to sense the pressure differential $\Delta P$ which develops across the trap, while thermocouple type temperature sensors 32, 33 are arranged to determined the inlet and outlet temperatures which prevail at the upstream and downstream ends of the trap and output TIN and TOUT signals respectively.

A crankable sensor 34 is arranged to detect the rotational speed Ne of the engine 1 while an engine load sensor 35 is arranged to output a signal Q indicative of accelerator pedal depression. An engine coolant temperature sensor 36 is arranged to output a Tw signal to the control unit.

The control unit 41 contains a microprocessor which responds to the outputs of the above mentioned sensor and appropriately outputs driver signals to the three-way solenoid valves 19, 23 and 27.

Before proceeding with a detailed description of the operation of the instant embodiment, it is deemed advantageous to briefly point out the various facets of control and the parameters which influence the same.

Before proceeding with a detailed description of the operation of the instant embodiment, it is deemed advantageous to briefly point out the various facets of control and the parameters which influence the same.

1. TEMPERATURE CONTROL

Figure 6:
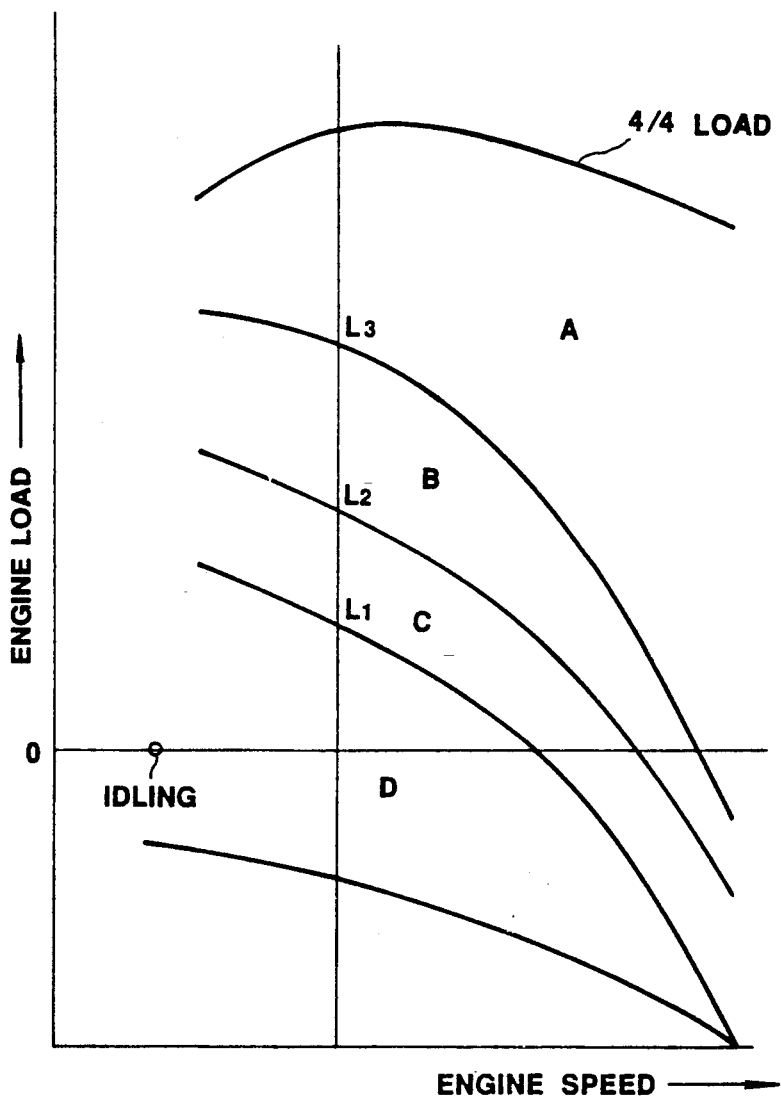
FIG. 6 is a graph which shows in terms of engine speed and engine load four zones A-D which are used in connection with the first embodiment of the invention.

The engine speed/load conditions are divided into four ranges A–D as show in FIG. 6. The above mentioned temperature control arrangement is arranged to operate in a different mode in each of these ranges. In FIG. 6 the 4/4 load denotation indicates the characteristics obtained under full load operation with the accelerator pedal depressed and the fuel injection pump 11 conditioned for maximum injection.

Range A—Mode (i)

In this range, as the exhaust gas temperature is above the regeneration temperature TREG ($\approx 400°$ C.) as indicated in FIG. 5, trap regeneration initiates spontaneously and no control is required. It will be noted that FIG. 5 shows the exhaust gas temperature changes which occur with change in engine load at constant engine speed.

Range B—Mode (ii)

The regeneration temperature TREG is reached after the exhaust gases are increased somewhat. In this range, if the throttle valve is arbitrarily closed to induce the required temperature increase, as the engine is operating under a relatively high load, the amount of smoke which is produced increases abruptly as the excess air ratio is relatively small under such conditions. Accordingly, it is preferred to energize the heater 29 while throttling only the exhaust flow.

Range C—Mode (iii)

In this range the regeneration temperature is not reached until the exhaust gas temperature has been raised by a considerable amount as will be appreciated from FIG. 5. However, as the excess air ratio is relatively large the amount smoke and particulate matter does not increase in response to induction throttling. Accordingly, in this range both the exhaust and the induction are throttled while energizing the heater.

Range D—Mode (iv)

In this range the regeneration temperature TREG cannot be obtained even if the induction and exhaust systems are throttle and the heater is energized. However, it is possible to use the high exhaust temperatures which occur during transient modes of operation, for example, during a change from high speed/highload into range D. For this reason D range is considered as being divided into three sub-sections:

D1 ($TIN \leq T1$),

D2 ($TIN < T1$) and

D3 ($Tin < T1$ and $TOUT < T2$).

NB $T1 = 400°$ C.
$T2 = 300°$ C.

Where possible the high exhaust gas temperatures are actively used in the corresponding sub-modes (iv-1) to (iv-3).

(iv-1) Range D1

Although regeneration can be spontaneously initiated in this range it is preferred to additionally energize the heater 29.

(iv-2) Range D2

In this range the temperature TOUT at the downstream side of the trap 3 is lower than the temperature TIN at the upstream end indicating that the trap is being cooled by the exhaust gases. Accordingly, in order to maintain the temperature of the trap 3 as high as possible, the heater is energized and the by-pass control valve 25 is opened. This directs the relatively cool exhaust gases around the trap while simultaneously heating the interior of the same.

(iv-3) Range D3

In this very low exhaust gas temperature range the regeneration temperature cannot be reached under any circumstances. If either of the engine induction or exhaust is throttled, the engine will misfire particularly at low engine coolant temperatures, resulting in the increase in particulate emission and degradation of engine output. Further, when the engine is cold (low coolant temperature) the trap will be cooled by the passage of the very-low temperature exhaust gases therethrough and it si accordingly preferred to open all of the throttle valves 6, 21 and 25 while leaving the heater off.

1. DETECTION OF REGENERATION COMPLETION

In the ranges A, B, C and D1 al of the particulate matter which is collected in the trap 3 is regenerated in response to the increase in exhaust gas temperature, while the particulate matter which is contained in the exhaust gases is collected.

Assuming that KT is the amount of particulate matter reburnt per unit time $\Delta t$ and K is the amount of particulate which is collected in that time, the amount of reduction in the particulate in the trap per unit time can be expressed as:

$$\Delta PCT = KT - K \quad (1)$$

In this case the value of KT is dependent on the exhaust gas temperature prevailing at the downstream side of the trap—viz., TOUT. Accordingly, KT is derived using the sensed value of TOUT.

On the other hand, the value of K is dependent on the operating range—viz., the amount of particulate matter contained in the exhaust gases is dependent on a number of engine operational parameters.

Assuming the that the total amount of particulate discharged from the engine in the unit time $\Delta t$ is represented by IN and the efficiency of the trap is given by h then the product of $IN \times h$ ($=K$) will be indicative of the amount of particulate collected per unit time ($\Delta t$).

Thus for each zone of operation is necessary to derive the value of K independently, (viz., derive KA—KD)

Accordingly, equation (1) may be rewritten for each zone as follows:

$$RANGE\ A: \Delta PCT = KT - KA \quad (2)$$

$$RANGE\ B: \Delta PCT = KT - KB \quad (3)$$

$$RANGE\ C: \Delta PCT = KT - KC \quad (4)$$

$$RANGE\ D1: \Delta PCT = KT - KD \quad (5)$$

The $\Delta PCT$ value is integrated each time interval $\Delta t$. When the value of PCT (particulate decreasing amount) reaches a predetermined reference value all of the particulate matter is deemed to have been burnt and the regeneration completed. In this instance the reference value varies with the capacity of the trap.

It will be noted that the value of PCT for each of the ranges A–D1 may be expressed as:

$$RANGE\ A: PCT = PCT + KT - KA \quad (6)$$

$$RANGE\ B: PCT = PCT + KT - KB \quad (7)$$

$$RANGE\ C: PCT = PCT + KT - KC \quad (8)$$

$$RANGE\ D1: PCT = PCT + KT - KD \quad (9)$$

Range D2

In this range almost no particulate will be collected as the exhaust gases are directed through the by-pass passage 24. Accordingly, the value of $\Delta PCT$ per unit time $\Delta t$ is derived without the use of K:

$$\Delta PCT = KT \quad (10)$$

$$PCT = PCT + KT \quad (11)$$

Range D3

The value of $\Delta PCT$ is not derived in this range as no particulate matter is burnt and essentially none collected as the exhaust gases are by-passed around the trap.

The microprocessor included in the control unit 41 contains a ROM or the like type of memory unit in which a control program(s) is stored. The control routine implemented by this program is depicted in flow chart form in FIGS. 8A–8B.

At step S1 the engine speed Ne, engine load Q, coolant temperature Tw, in inlet and outlet temperatures TIN, TOUT of the trap 3, and the pressure differential which exists between the inlet and outlet of the trap $\Delta P$, are read into memory.

At step S2 it is determined if it is time for a trap regeneration or not. In this embodiment, this determination is made by comparing the instant $\Delta P$ value with a $\Delta Pmax$ value obtained from table data which is recorded in terms of engine speed and engineload. If $\Delta P \geq \Delta Pmax$ then it is determined that a predetermined amount of particulate matter has accumulated in the trap and it is now necessary to reburn the same.

It will be understood that the present invention is not limited to this particular method and other conventional techniques can also be used. Once determination that regeneration is required is made, a flag can be set which will induce the routine to flow to step S3 until such time as it is cleared by the routine being induced to pass through step S21 wherein the system is initialized in a manner to induce the pre-regeneration throttle valve and heater settings to be resumed. Viz., once a regeneration is initiated it should be maintained until such time as the particulate content is indicated has having been satisfactorily re-burnt.

In the event that the enquiry conducted in step S2 is affirmative, then the routine flows to step S3 wherein the instant coolant temperature Tw is compared with a predetermined value (e.g. 50° C.). If the Tw≧than the predetermined value the routine proceeds step S4.

Steps S4 to S7 are such as to determine which of the engine speed/load ranges A–D the instant engine speed and load values indicate the engine is operating in. This is done by comparing the instant engine speed and engine load values with tabled data of the nature shown in FIG. 6. In the event the engine speed-engine load coordinate falls in range A, the routine flows to step S10 while in the case of range B the routine goes to step 1011. In the case of ranges C and D the routine goes to steps 1012 and S8 respectively. At steps S8 and S9 the instant TIN and TOUT values are respectively compared with the reference values T1 and T2. This enable the determination of which of the sub-ranges D1 to D3 the instant operating conditions fall in.

In the case D1 is detected, the routine goes to step S13 while in the case of D2 the routine proceeds to step S14. In the event that the engine is deemed to be operating in range D3 the routine proceeds to step S15.

The following table lists the setting of the heater 29, the inlet (IN), exhaust (EX) and by-pass (BP) valves which are induced for ranges A–D3 in steps S10, S11, S12, S13 and S14, respectively.

TABLE

|  | BP VALVE | EX VALVE | IN VALVE | HEATER |
| --- | --- | --- | --- | --- |
| RANGE A | CLOSED | OPEN | OPEN | OFF |
| RANGE B | CLOSED | CLOSED | OPEN | ON |
| RANGE C | CLOSED | CLOSED | CLOSED | ON |
| RANGE D1 | CLOSED | OPEN | OPEN | ON |
| RANGE D2 | OPEN | OPEN | OPEN | ON |
| RANGE D3 | OPEN | OPEN | OPEN | OFF |

At steps S16–S19 the regeneration time is counted. This can be done by way of example by using a soft clock which increments each time the routine flows through any of the just mentioned steps. The count is checked at step S20.

When a predetermined value indicative of a time sufficient for a complete regeneration to have taken place (e.g. 10 mins) the routine flows around to step S21 wherein the heater, inlet exhaust and by-pass control valves are all returned to there initial default state (Viz., the heater is de-energized, the by-pass valve 25 is closed and the inlet and exhaust valves 6, 21 are opened).

In the event that step S3 indicates that the engine coolant temperature Tw is below the predetermined value then the routine flows to step S22 wherein the instant trap inlet temperature TIN value is compared with T1. In the event that TIN≧T1 it is indicated that the trap can be regenerated and the routine flows to step S10. However, if TIN value is insufficiently high then the routine goes to steps S23 and S24 wherein all of the flow control valves 6, 21 and 25 are opened and the heater is de-energized. As mentioned above, the reason for these latter settings is that in this very low exhaust gas temperature range the regeneration temperature cannot be reached under any circumstances. If either of the engine induction or exhaust is throttled, the engine will misfire particularly at low engine coolant temperatures, resulting in the increase in particulate emission and degradation of engine output. Further, as the engine is cold the trap will be cooled by the passage of the very low temperature exhaust gases therethrough.

As will be appreciated from the traces shown in FIG. 7, when the engine is operating in either of ranges B and C wherein the exhaust gas temperature is below TREG, the heater is energized and induction and exhaust flow control valves 6, 21 are set to throttle the flows through induction and exhaust conduits (note that in range B the induction throttle valve 6 is left open to avoid smoke formation as mentioned above). These measures raise the temperature of the exhaust gases sufficiently to induce regenerative reburning.

It should be noted that in range C it is not necessary to throttle the exhaust gas flow to an extensive degree. This is effective in that it reduces the exhaust back pressure and alleviates the problem wherein the valve stick and or deformation take place.

In the case of operation in the D range, even though the exhaust gases cannot be raised to the TREG level, it is possible to make use of the heat which is retained in the trap to maintain regeneration by controlling the by-pass valve 25 and heater 29 in the D1 and D2 sub-ranges.

SECOND EMBODIMENT

FIGS. 9 to 13 show a second embodiment of the present invention. This embodiment differs from the first one in that induction and exhaust throttle valves 6, 21 are controlled by duty signal operated solenoid valves 81 and 82 in place of the ON/OFF type units 19, 23. This permits the positions of the two valves to be finely adjusted by selectively varying the duty ratios DON applied thereto.

An exhaust pressure sensor 83 is disposed in the exhaust passage 2 at a location upstream of the upstream end of the by-pass passage 24. A induction pressure sensor 84 is disposed in the induction manifold at a location downstream of the induction throttle valve 6. The signals Pex and Pin produced by the sensors 83 and 84, are supplied to the controller 41 and used for feedback control.

Figure 8A:
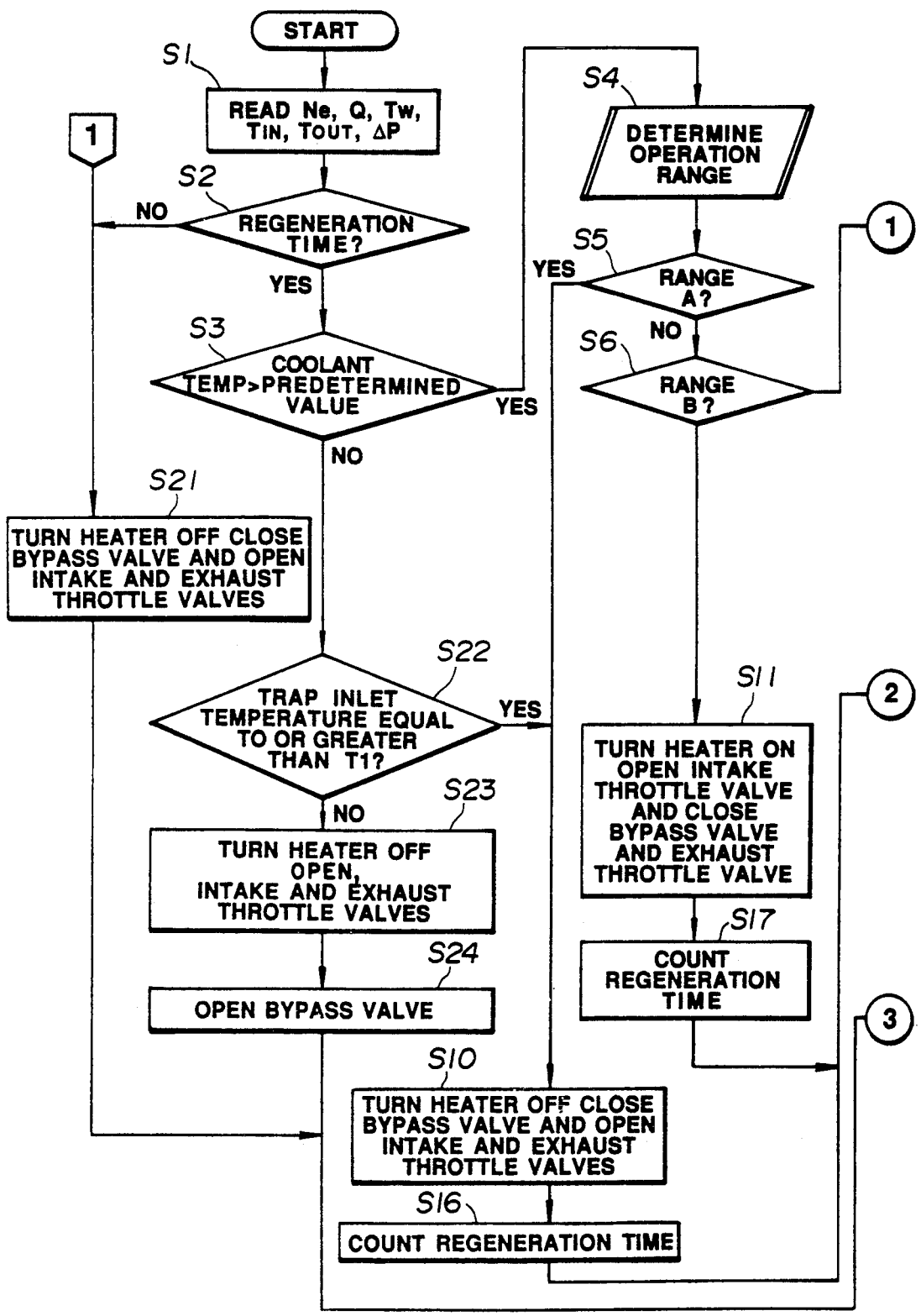
FIG. 8 is a flow chart showing the steps which characterize the operation of the first embodiment of the present invention.
Figure 8B:
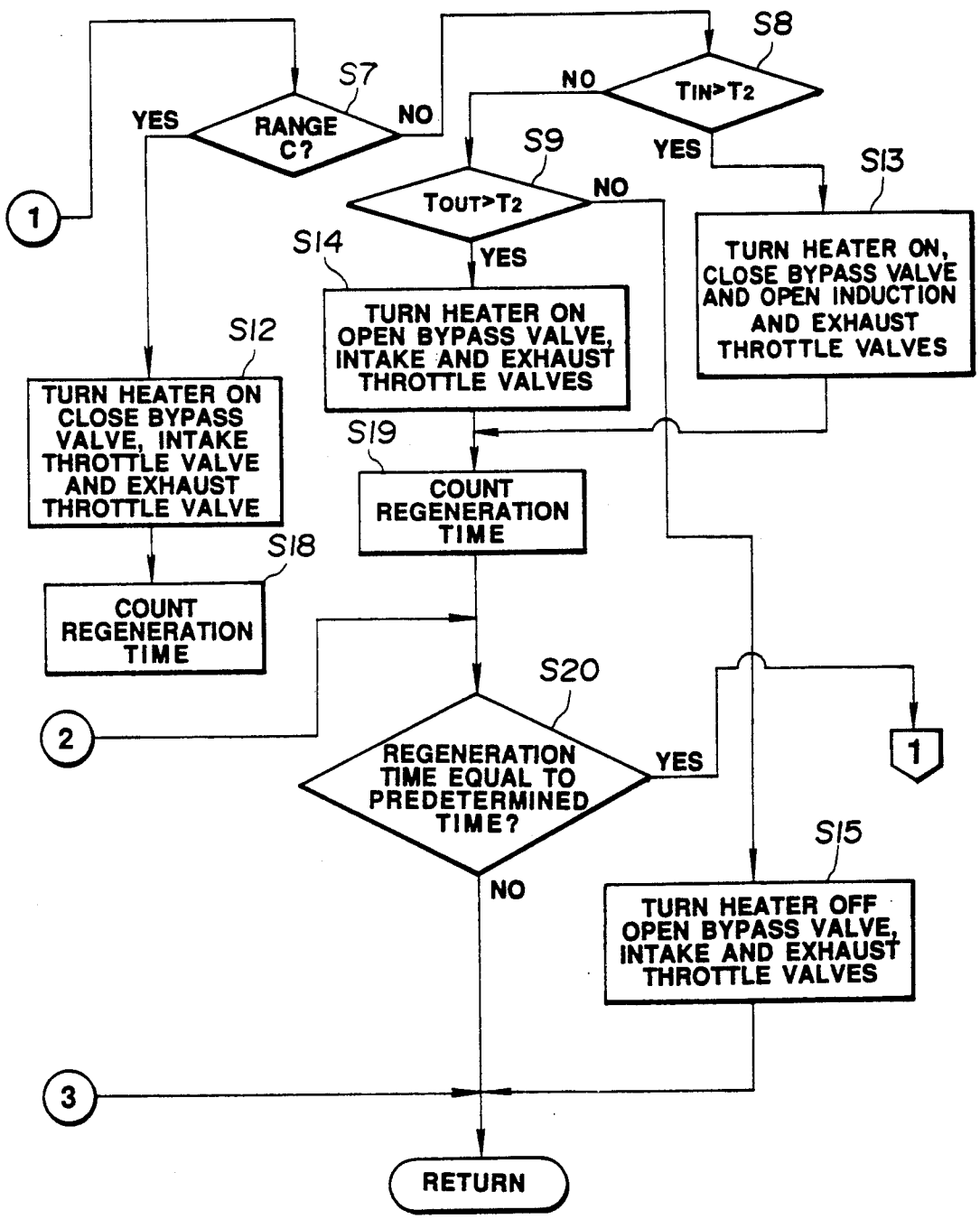
Figure 9:
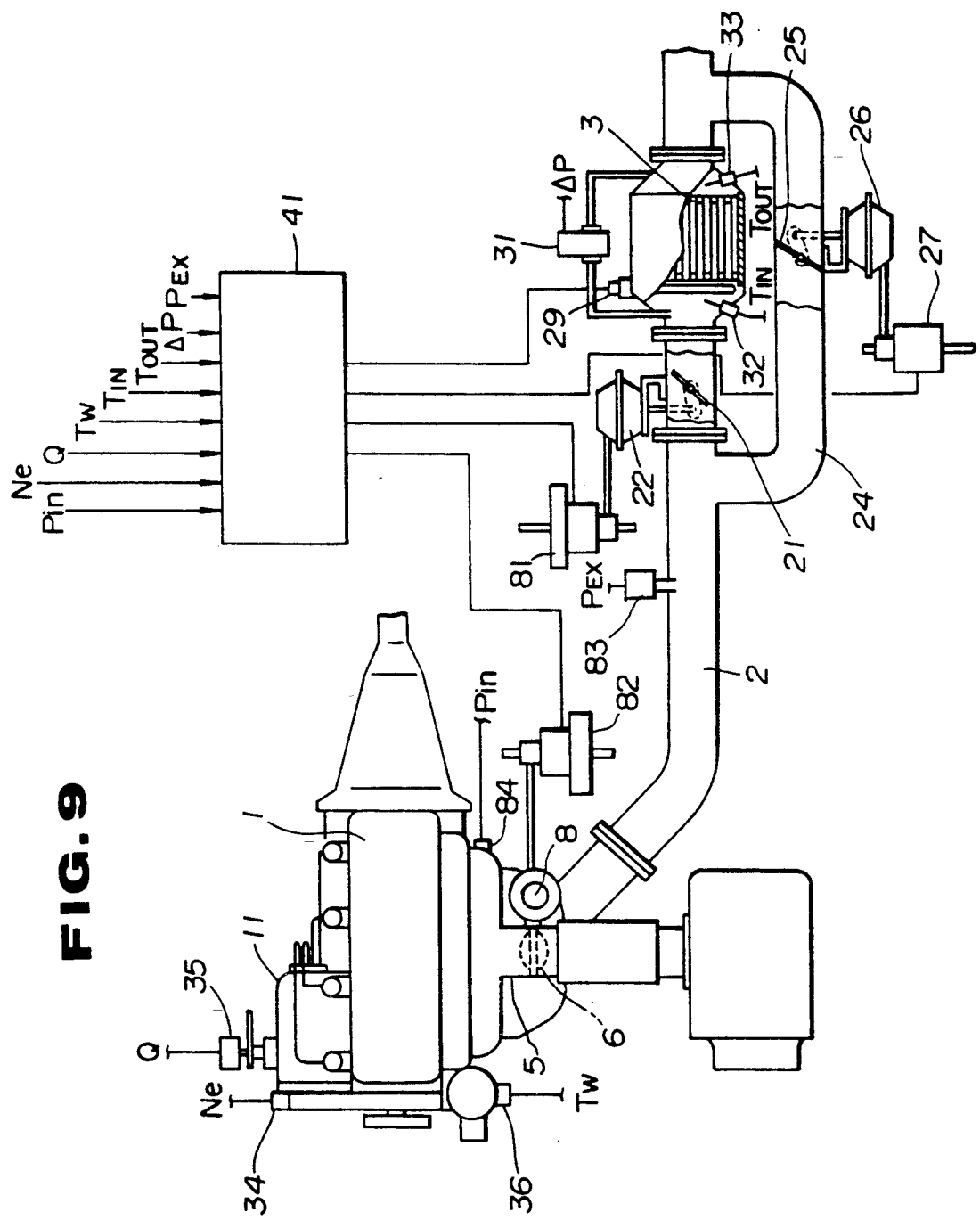
FIG. 9 is a plan view of an engine system to which a second embodiment of the invention is applicable.
Figure 11A:
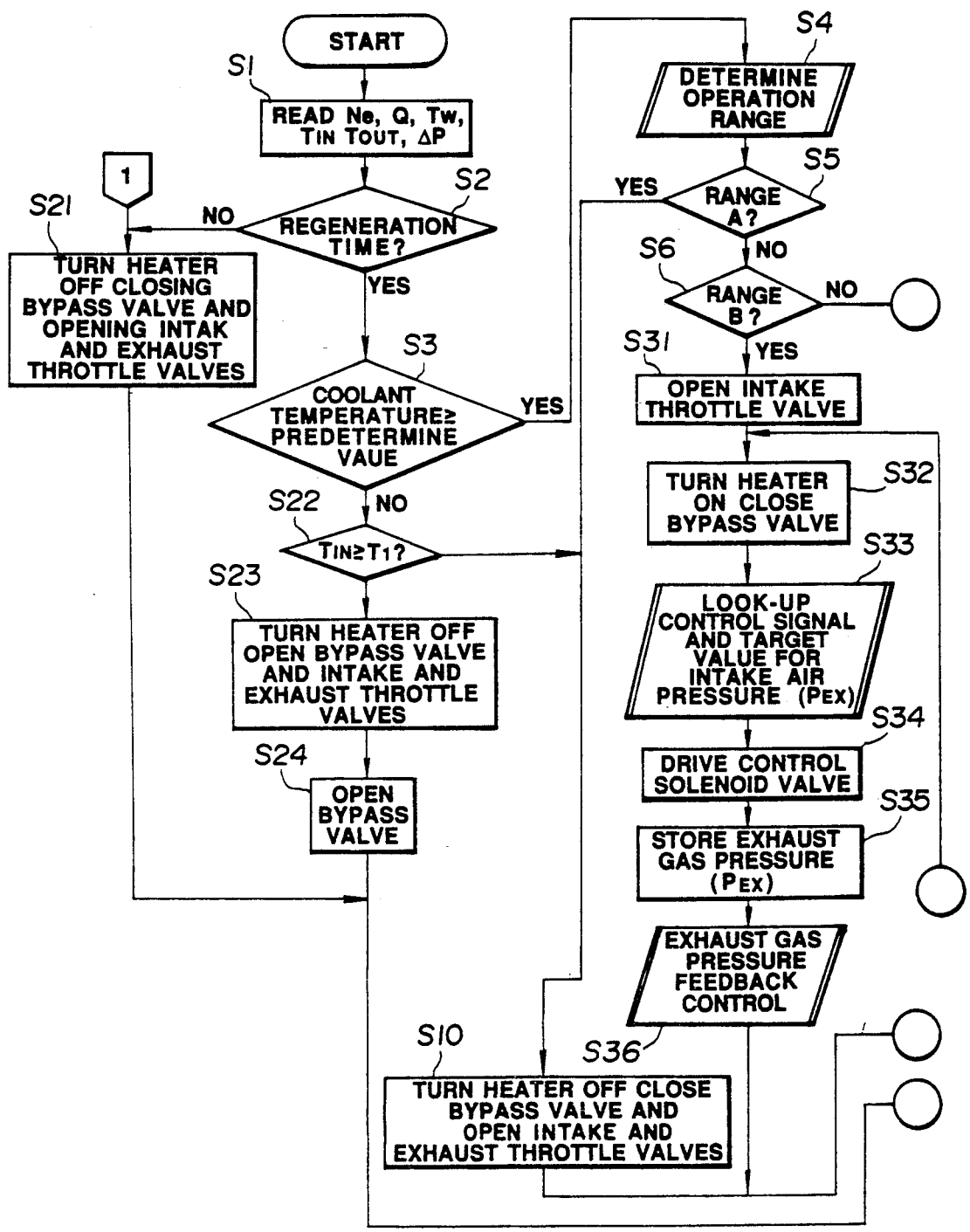
FIG. 11 is a flow chart showing the steps which characterize the operation of the second embodiment.
Figure 11B:
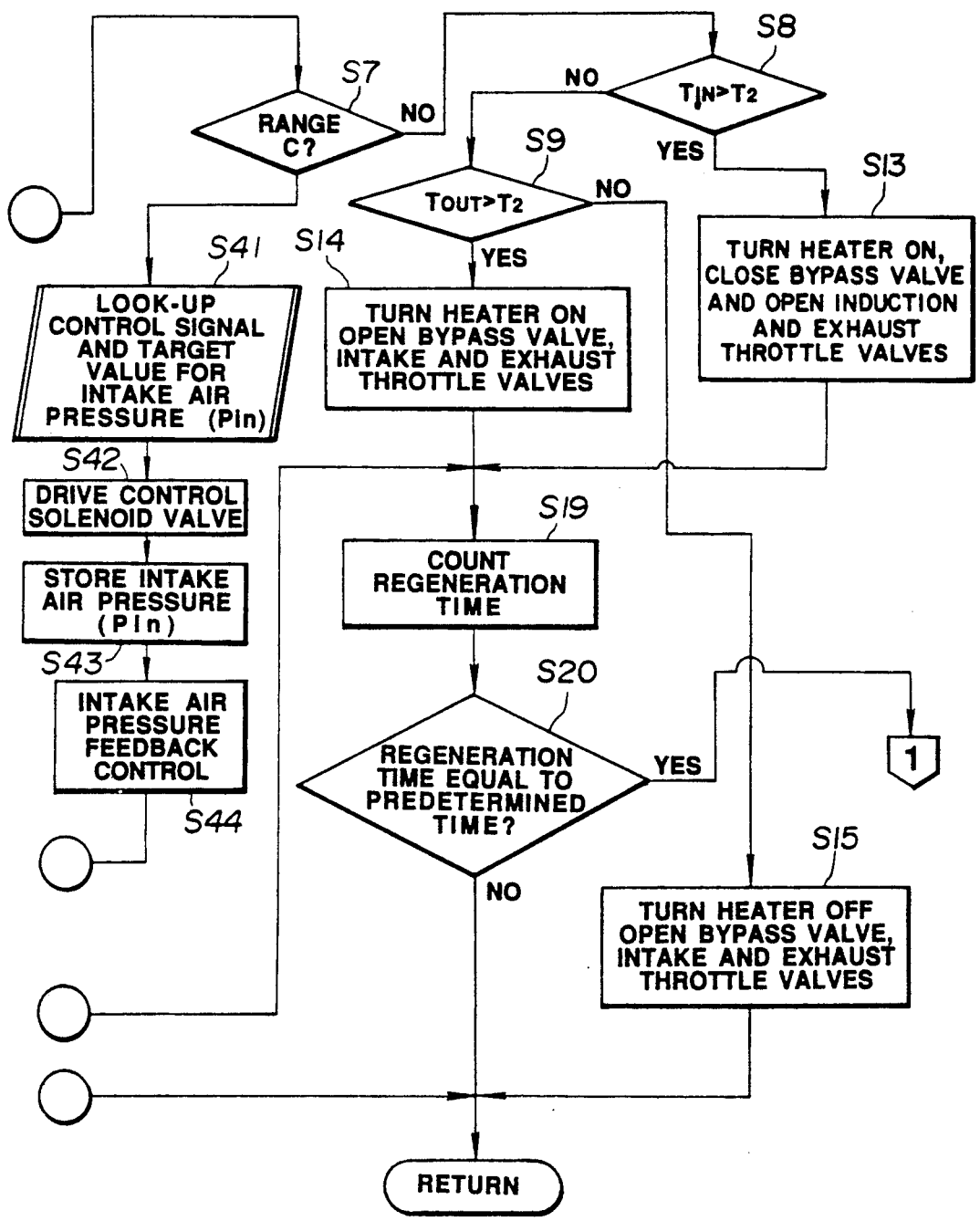

The steps shown in the flow chart of FIGS. 11A and 11B are basically the same as those shown in FIGS. 8A and 8B and differ in that at steps S11 and S17 are replaced with steps S33 to S36 and steps S12 and S18 are replaced with steps S41 to S44.

Figure 12:
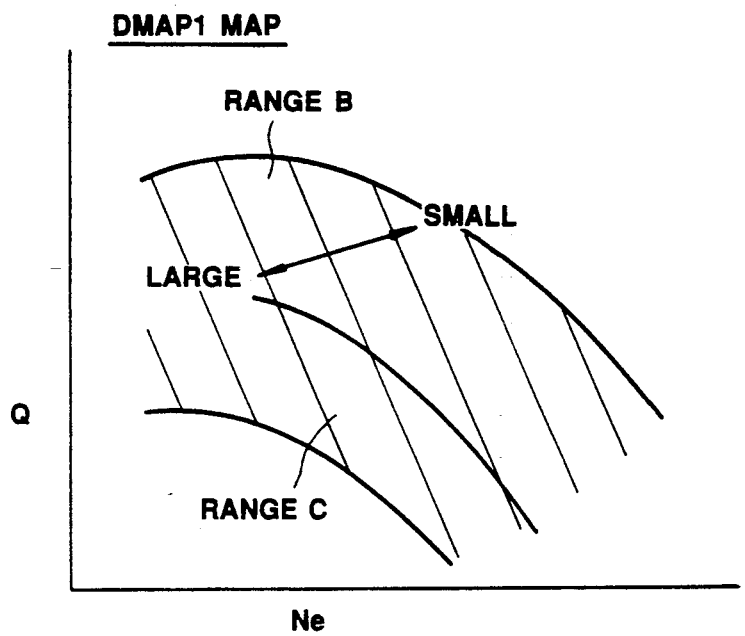
FIGS. 12 and 13 are graphs depicting tabled data which is used in connection with the operation of the second embodiment.
Figure 13:
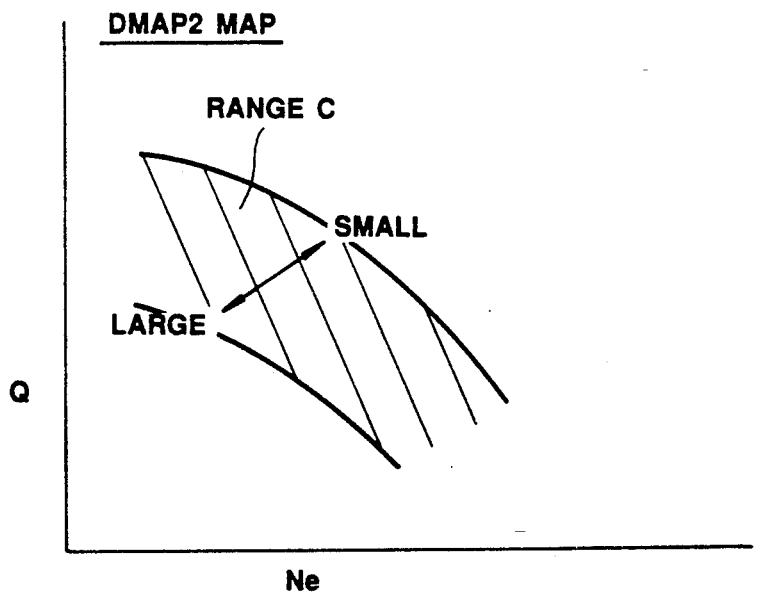

At step S33 a basic duty ratio DMAP1 and a target back pressure value PM are obtained by look-up Data of the nature shown in FIG. 12 is used to obtain the DMAP1 value. This DMAP1 value is used to control the flow restriction degree of the exhaust throttle valve 21 in a manner which maintains the exhaust gas back pressure constant at the predetermined target pressure PM as the engine load increases in the B and C ranges of engine operation.

The solenoid valve 81 is arranged to receive a vacuum signal having a constant level and so that as the value of DMAP1 increases the amount of vacuum supplied to the vacuum chamber of the vacuum servo 22 increases and results in the closure degree of the valve 21 increasing.

At step S34 the appropriate ON/OFF pulse signal is generated on the just derived DMAP1 value and at step S35 the output Pex of the exhaust pressure sensor 47 is sampled and the value set in memory.

At step the Pex value is used to feedback control the DMAP1 value in a manner to adjust the same so that the backpressure is controlled to exactly the required PM level.

In steps S41-S44 solenoid valve 82 is controlled by signal which is based on a DMAP2 value. This value is obtained by look-up (step S41) using tabled data of the nature shown in FIG. 13. The output Pin of the induction pressure sensor 84 is sampled and memorized (step S43) and subsequently used to adjust the DMAP2 value (step S44) so as to maintain the induction pressure at a predetermined value derived during the look-up in step S41.

While the second embodiment is essentially the same as the first out, it features the advantage of obviating the shock which tends to be produced by the ON/OFF type of operation inherent with the valve arrangement of the first embodiment. Viz., the throttle valves 6 and 21 are arranged to move directly from a fully open state to a predetermined partially closed state. The second embodiment enables the smooth transition from one position to another and thus features improved operational characteristics depicted in FIG. 10. That is to say, as will be appreciated from this FIGURE the exhaust gas temperature can be raised to, and smoothly maintained at, the TREG level up until the end of range B. This can be compared with the sawtooth-like characteristics (see FIG. 7) produced by the first embodiment.

As the feedback control of the intake throttle valve has priority over the feedback control of the exhaust throttle valve 21 during C range operation, the position of the exhaust valve 21 tends to remain constant and obviates the tendency for hunting due to the dual control, to occur.

It will be noted that the counting steps corresponding to step S16 to S18 are omitted and the routine is arranged to make use of step S19 alone. A similar modification of the routine shown in FIGS. 8A and 8B is also possible if so desired.

It is further to be understood that the invention is not limited to the above described exhaust gas temperature elevation heater/throttling techniques and that other suitable measures may be used without departing from the scope of the present invention.

What is claimed is:

1. In an exhaust purifying system
a trap which is disposed in an exhaust passage and which separates and collects particulate matter contained in the gases exhausted from an internal combustion engine;
trap heating means for heating the interior of said trap;
a by-pass passage which by-passes said trap, said by-pass passage having an upstream end which communicates with the exhaust passage at a location upstream of said trap and a downstream end which communicates with said exhaust passage at a location downstream of said trap;
a by-pass passage control valve which is disposed in said by-pass passage, said by-pass control valve being operatively connected with a servo;
means for determining if the exhaust gases will have a temperature slightly below a predetermined trap regeneration temperature at which accumulated particulate matter in the trap will undergo spontaneous combustion; and
means responsive to the determining means for operating said servo in a manner to close said by-pass passage control valve and for energizing the trap heating means.

2. An exhaust purifying system comprising:
a trap which is disposed in an exhaust passage and which separates and collects particulate matter contained in the gases exhausted from an internal combustion engine;
trap heating means for heating the interior of said trap;
a by-pass passage which by-passes said trap, said by-pass passage having an upstream end which communicates with the exhaust passage at a location upstream of said trap and a downstream end which communicates with said exhaust passage at a location downstream of said trap;
a by-pass passage control valve which is disposed in said by-pass passage, said by-pass control valve being operatively connected with a servo;
first sensor means for sensing the engine speed and load;
second sensor means for sensing the temperature at the upstream and downstream ends of said trap;
means responsive to the first and second means for determining if the engine is operating in a zone wherein the exhaust gas temperature at the upstream end of the trap is significantly below a predetermined regeneration temperature at which the accumulated particulate matter in the trap will undergo spontaneous combustion, and if the exhaust gas temperature at the downstream end of the trap is below the predetermined regeneration temperature by a predetermined amount;
means for determining if trap regeneration is required; and
means for preventing cooling of the trap, said trap cooling preventing means
opening the by-pass control valve to divert exhaust gases which tend to cool the trap, through the by-pass passage, and
energizing said trap heating means to heat the interior of the trap when said trap regeneration requirement determining means determines that a trap regeneration is required, and said zone determining means indicates that the temperature of the exhaust gas at the downstream end of the trap is below the predetermined regeneration temperature by the predetermined amount.

3. In an internal combustion engine
a first sensor which senses engine speed;
a second sensor which senses engine load;
a third sensor for sensing engine coolant temperature;
an induction passage;
a first flow control valve disposed in said induction passage for restricting the amount of air passing therethrough;
a first servo operatively connected with said first flow valve;
a first servo control valve which controls the operation of said first servo, said first servo control valve being arranged to be responsive to a first control signal;
an exhaust conduit;
a second flow control valve disposed in the exhaust conduit for restricting the flow of gas therethrough;
a second servo operatively connected with said second flow valve;
a second servo control valve which controls the operation of said second servo, said second servo control valve being arranged to be responsive to a second control signal;

a trap disposed in said exhaust conduit downstream of said second valve, said trap being arranged to separate and collect particulate matter contained in the gases which flow through the exhaust conduit;

a heater disposed in said exhaust passage immediately upstream of said trap;

a by-pass passage having an upstream end fluidly communicated with said exhaust passage at a location upstream of said second valve and a downstream end communicating with said exhaust passage a location downstream of said trap;

a third flow control valve disposed in said by-pass passage for restricting the flow of gas therethrough;

a third servo operatively connected with said third flow valve;

a third servo control valve which controls the operation of said third servo, said third servo control valve being arranged to be responsive to a third control signal;

a fourth sensor for sensing the temperature of the gases entering said trap;

a fifth sensor for sensing the temperature of the gases coming out of said trap;

a sixth sensor for sensing a pressure differential which prevails across the upstream and downstream ends of said trap;

a control unit operatively connected with said heater, said first to sixth sensors and said first to third flow control valves, said control unit including circuitry which includes means for selectively energizing said heater and for operating said first to third flow control valves in a manner which enables the flow through said induction and exhaust conduits to be variably throttled to increase the temperature in said trap to a level whereat combustion of the combustible fraction of the particulate matter collected therein, is induced.

4. An internal combustion engine as claimed in claim 3 wherein said first and second control signals are variable and wherein said first and second control valves are arranged to respond to the first and second control signal in a manner in which the first and second servos are controlled to selectively position the first and second flow control valves in or between predetermined minimum and maximum closure positions.

5. An exhaust purifying system comprising:

a trap which separates and collects particulate matter contained in the gases exhausted from an internal combustion engine;

trap temperature increasing means comprising:

an exhaust throttle valve disposed in an exhaust conduit which leads from the internal combustion engine to the trap, said exhaust throttle valve being operatively connected with a first servo;

an induction throttle valve disposed in an induction passage which leads to said engine, said induction valve being operatively connected with a second servo;

sensor means for sensing engine speed and engine load;

control means which is operatively connected with said sensor means and which contains a control schedule which is divided into first and second engine speed/load zones, the first zone being one in which the exhaust gases which are being produced by the engine have a temperature which is slightly lower than a predetermined regeneration temperature at which accumulated particulate material in the trap will spontaneously combust and induce trap regeneration, the second zone being one in which the exhaust gases being produced by the engine have a temperature which is significantly lower than the predetermined regeneration temperature, said control means being responsive to the sensor means for determining which of the two zones the engine is currently operating in and for controlling the operation of said first and second servos so that when the engine is operating in the first range and trap regeneration is required, only the exhaust throttle valve is closed to restrict induction, while in the second zone when trap regeneration is required both the induction and the exhaust throttle valves are induced to close.

6. An exhaust purifying system comprising:

a trap which is disposed in an exhaust passage and which separates and collects particulate matter contained in the gases exhausted from an internal combustion engine;

trap temperatures increasing means for heating the interior of said trap;

a by-pass passage which by-passes said trap, said by-pass passage having an upstream end which communicates with the exhaust passage at a location upstream of said trap and a downstream end which communicates with said exhaust passage at a location downstream of said trap;

a by-pass passage control valve which is disposed in said by-pass passage, said by-pass control valve being operatively connected with a servo;

first means for determining if trap regeneration is required;

second means for determining if the exhaust gases will have a temperature slightly below a predetermined trap regeneration temperature at which accumulated particulate matter in the trap will undergo spontaneous combustion; and means responsive to the second means determining that the exhaust gases have a temperature slightly below a predetermined trap regeneration temperature for operating said servo in a manner to close said by-pass passage control valve and for energizing the trap heating means when said first means determines that a trap regeneration is required.

7. An internal combustion engine;

a first sensor which senses engine speed;

a second sensor which senses engine load;

a third sensor for sensing engine coolant temperature;

an induction passage;

a first flow control valve disposed in said induction passage for restricting the amount of air passing therethrough;

a first servo operatively connected with said first flow valve;

a first servo control valve which controls the operation of said first servo, said first servo control valve being arranged to be responsive to a first control signal;

an exhaust conduit;

a second flow control valve disposed in the exhaust conduit for restricting the flow of gas therethrough;

a second servo operatively connected with said second flow valve;

a second servo control valve which controls the operation of said second servo, said second servo control valve being arranged to be responsive to a second control signal;

a trap disposed in said exhaust conduit downstream of said second valve, said trap including a filter which separates and collect particulate matter contained in the gases which flow through the exhaust conduit;

a selectively energizable heater disposed in said trap immediately upstream of said filter, said selectively energizable heater, said first flow control valve and said second flow control valve form part of a trap temperature increasing means;

a by-pass passage having an upstream end fluidly communicated with said exhaust passage at a location upstream of said second valve and a downstream end communicating with said exhaust passage a location downstream of said trap;

a third flow control valve disposed in said by-pass passage for restricting the flow of gas therethrough;

a third servo operatively connected with said third flow valve;

a third servo control valve which controls the operation of said third servo, said third servo control valve being arranged to be responsive to a third control signal;

a fourth sensor for sensing the temperature of the gases entering said trap;

a fifth sensor for sensing the temperature of the gases coming out of said trap;

a sixth sensor for sensing a pressure differential which prevails across the upstream and downstream ends of said trap;

a control unit operatively connected with said heater, said fist to sixth sensors and said first to third flow control valves, said control unit including circuitry which includes means for selectively energizing said heater and for operating said first to third flow control valves in a manner which enables the flow through said induction and exhaust conduits to be variably throttled to increase the temperature in said trap to a level whereat combustion of the combustible fraction of the particulate matter collected therein, is induced.

8. An internal combustion engine as claimed in claim 7 wherein said first and second control signals are variable and wherein said first and second control valves are arranged to respond to the first and second control signal in a manner in which the first and second servos are controlled to selectively position the first and second flow control valves in or between their respective minimum and maximum closure positions.

9. An internal combustion engine as claimed in claim 7 further comprising an induction pressure sensor and an exhaust pressure sensor, said induction and exhaust pressure sensors being operatively connected with said control unit, the outputs of the induction and exhaust pressure sensors being used for feedback control of the first and second flow control valve positions.

10. An exhaust purifying system for an internal combustion engine, comprising:
a trap disposed in an exhaust conduit of the engine for collecting particulate matter;
trap heating means including:

an induction passage throttle valve which is disposed in an induction passage of the engine and which is operatively connected with a first servo device;

an exhaust passage throttle valve which is disposed in the exhaust passage and which is operatively connected with a second servo device; and an energizable trap heater which is disposed immediately upstream of the trap;

a by-pass passage which by-passes the trap, said by-pass passage having an upstream end which communicates with the exhaust passage at a location upstream of said trap and a downstream end which communicates with said exhaust passage at a location downstream of said trap;

a by-pass passage control valve which is disposed in said by-pass passage and which is operatively connected with a third servo device;

an upstream temperature sensor for sensing the temperature of the exhaust gases entering the trap;

a downstream temperature sensor for sensing the temperature of the exhaust gases entering the trap;

a downstream temperature sensor for sensing the temperature of the exhaust gases which are emitted from the trap;

a pressure differential sensing arrangement which samples the pressures prevailing at the upstream and downstream ends of the trap and issues a signal indicative of the pressure differential which exists between the inlet and outlets of the trap;

engine sensor means for sensing the operational parameter of the engine; and a control unit which is operatively connected with the first, second and third servo, the trap heater, the pressure differential sensing arrangeme.it, the upstream temperature sensor, the downstream temperature sensor, and engine sensor means, the control unit including means which, during trap regeneration:

conditions the by-pass passage control valve to assume a closed position and prevent the passage of exhaust gases through the by-pass passage;

determines the rate at which the particulate matter in the trap is being reduced by determining the difference between:
the amount of particulate matter being burnt per unit time based on the temperature at the downstream end of the trap, and
the amount of particulate matter being collected per unit time based on the operational parameters of the engine;
integrates the reduction rate at which the particulate matter in the trap is being reduced; and
determines that all of the particulate matter has been reburnt when the integrated value reaches a predetermined reference value.

11. An exhaust purifying system for an internal combustion engine, as set forth in claim 10, wherein said control unit further includes means which during trap regeneration:
determines if the engine is operating in a first mode wherein exhaust gas temperature is above the regeneration temperature and first inducting the by-pass control valve to assume a closed position, inducing the heater to assume a de-energized state and the induction throttle valve and exhaust throttle valve to assume open positions.

12. An exhaust purifying system for an internal combustion engine, as set forth in claim 10, wherein said control unit further includes means which during trap regeneration:

determines if the engine is operating in a second mode wherein the regeneration temperature is reached after the exhaust gas temperature is increased by a small amount and energizes the heater, closes the by-pass passage control valve and reduces the opening of the exhaust passage valve.

13. An exhaust purifying system for an internal combustion engine, as set forth in claim 10, wherein said control unit further includes means which, during trap regeneration:

determines if the engine is operating in a third mode wherein the temperature of the exhaust gases will not reach the regeneration temperature until such time as the exhaust gas temperature has been raised by a large amount, and reduces the opening degree of the induction passage throttle valve and the exhaust passage throttle valve, energizes heater and closes the by-pass passage control valve.

14. An exhaust purifying system for an internal combustion engine, as set forth in claim 10, wherein said control unit further includes means which:

determines if the engine is operating in a fourth mode wherein the temperature of the exhaust gases cannot be raised to the regeneration level and which:
a) energizes the heater, closes the by-pass passage control valve and opens the induction passage throttle valve and the exhaust passage throttle valve while the temperature upstream of the trap is detected as being greater to or equal than a predetermined temperature;
b) energizes the heater, and opens the by-pass passage control valve, the induction passage throttle valve and the exhaust passage throttle valve while the temperature upstream of the trap is detected as being less than the predetermined temperature, and the temperature at the downstream end of the trap is detected as being equal to or greater than a second predetermined temperature; and
c) de-energizes the heater, and opens the by-pass passage control valve, the induction passage throttle valve and the exhaust passage throttle valve while the temperature upstream of the trap is detected as being less than the first predetermined temperature and the temperature at the downstream end of the trap is detected as being less than the second predetermined temperature.

* * * * *